(12) United States Patent
Schilm et al.

(10) Patent No.: US 9,966,628 B2
(45) Date of Patent: May 8, 2018

(54) SOLID-STATE ELECTROLYTE FOR USE IN LITHIUM-AIR BATTERIES OR IN LITHIUM-WATER BATTERIES

(71) Applicant: Fraunhofer-Gesellschaft zur Foerderung der angewandten Forschung, Munich (DE)

(72) Inventors: Jochen Schilm, Dresden (DE); Axel Rost, Dresden (DE); Mihails Kusnezoff, Dresden (DE)

(73) Assignee: PRAUNHOFER-GESELLSCHAFT ZUR FOERDERUNG DER ANGEWANDTEN FORSCHUNG, Munich (DE)

( * ) Notice: Subject to any disclaimer, the term of this patent is extended or adjusted under 35 U.S.C. 154(b) by 43 days.

(21) Appl. No.: 14/364,791

(22) PCT Filed: Nov. 16, 2012

(86) PCT No.: PCT/EP2012/072876
§ 371 (c)(1),
(2) Date: Jun. 12, 2014

(87) PCT Pub. No.: WO2013/087355
PCT Pub. Date: Jun. 20, 2013

(65) Prior Publication Data
US 2014/0349197 A1    Nov. 27, 2014

(30) Foreign Application Priority Data
Dec. 12, 2011    (DE) .................. 10 2011 121 236

(51) Int. Cl.
*H01M 10/0562* (2010.01)
*H01M 10/052* (2010.01)
(Continued)

(52) U.S. Cl.
CPC ......... *H01M 10/0562* (2013.01); *C03B 19/06* (2013.01); *C03B 32/02* (2013.01);
(Continued)

(58) Field of Classification Search
None
See application file for complete search history.

(56) References Cited

U.S. PATENT DOCUMENTS 7,255,961 B2 * 8/2007 Schucker ............... B32B 18/00
429/129
2007/0172739 A1 7/2007 Visco et al.
(Continued)

FOREIGN PATENT DOCUMENTS

EP        0499935 A1    8/1992
JP        S63166160 A   9/1988
(Continued)

OTHER PUBLICATIONS

B. Kumar et al., "Space Charge Signature and Its Effects on Ionic Transport in Heterogenous Solids", J. America Ceram. Soc., vol. 90, No. 10, Oct. 1, 2007.
(Continued)

*Primary Examiner* — Daniel S Gatewood
(74) *Attorney, Agent, or Firm* — Jacobson Holman, PLLC.

(57) ABSTRACT

The invention relates to solid-state electrolytes for use in lithium-air batteries or in lithium-water batteries. It is the object of the invention to provide solid electrolyte for use in lithium-air batteries or lithium-water batteries, with the solid electrolyte having sufficient strength, good conductivity for lithium ions, imperviousness for gas and water resistance and being inexpensive in manufacture. The solid-state electrolyte in accordance with the invention has an open-pore ceramic carrier substrate. In this respect, at least one layer
(Continued)

Figure 1:
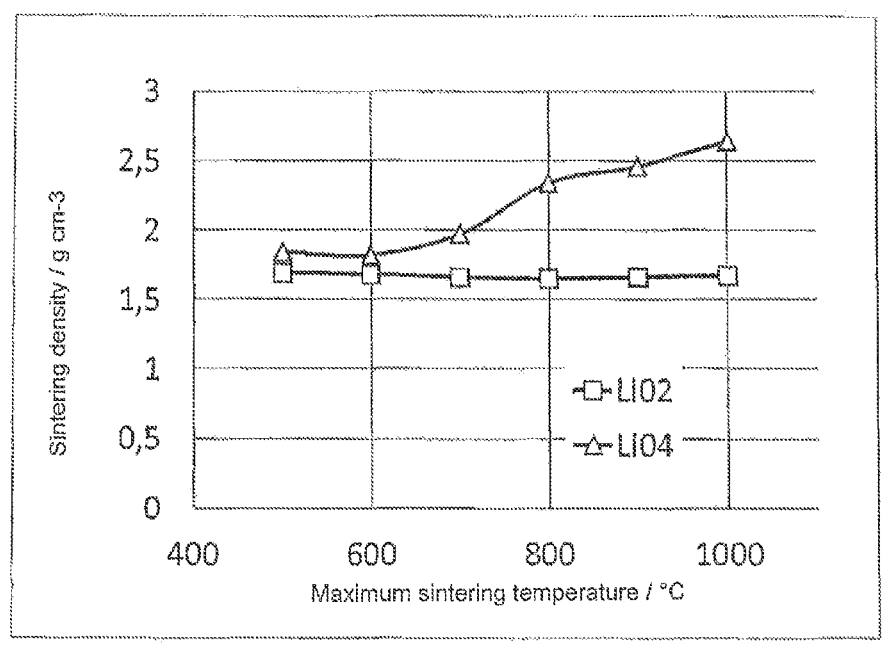

which is conductive for lithium ions, which has an electrical conductivity of at least $10^{-5}$ $Scm^{-1}$ and which is gas-impervious is formed on the surface facing the cathode. In this respect, the carrier substrate has greater mechanical strength and a larger layer thickness than the at least one layer.

8 Claims, 3 Drawing Sheets

(51) Int. Cl.
| | |
|---|---|
| H01M 6/18 | (2006.01) |
| C03B 32/02 | (2006.01) |
| C03B 19/06 | (2006.01) |
| C03C 10/00 | (2006.01) |
| C03C 3/062 | (2006.01) |
| C04B 35/447 | (2006.01) |
| H01M 10/36 | (2010.01) |
| H01M 12/08 | (2006.01) |
| C04B 38/00 | (2006.01) |
| C03C 3/21 | (2006.01) |

(52) U.S. Cl.
CPC ............ *C03C 3/062* (2013.01); *C03C 3/21* (2013.01); *C03C 10/00* (2013.01); *C04B 35/447* (2013.01); *C04B 38/00* (2013.01); *H01M 6/18* (2013.01); *H01M 10/052* (2013.01); *H01M 10/36* (2013.01); *H01M 12/08* (2013.01); *C04B 2235/3203* (2013.01); *C04B 2235/3217* (2013.01); *C04B 2235/3232* (2013.01); *C04B 2235/3418* (2013.01); *C04B 2235/44* (2013.01); *C04B 2235/447* (2013.01); *C04B 2235/604* (2013.01); *C04B 2235/6562* (2013.01); *C04B 2235/6565* (2013.01); *C04B 2235/80* (2013.01); *C04B 2235/9615* (2013.01); *H01M 2300/0031* (2013.01); *H01M 2300/0071* (2013.01); *H01M 2300/0077* (2013.01); *Y02E 60/128* (2013.01)

(56) References Cited

U.S. PATENT DOCUMENTS

| | | | |
|---|---|---|---|
| 2007/0231704 | A1 | 10/2007 | Inda |
| 2009/0226816 | A1* | 9/2009 | Yoshida .................. H01M 4/13 429/304 |
| 2009/0311567 | A1* | 12/2009 | Visco .................. H01M 2/1673 429/403 |
| 2009/0317724 | A1 | 12/2009 | Kumar et al. |
| 2010/0113243 | A1 | 5/2010 | Inda |
| 2010/0316903 | A1* | 12/2010 | Kim .................... H01M 2/1653 429/145 |
| 2011/0262836 | A1* | 10/2011 | Kumar .................. H01M 12/08 429/483 |

FOREIGN PATENT DOCUMENTS

| | | |
|---|---|---|
| JP | H02225310 A | 9/1990 |
| JP | 2011-187370 A | 9/2011 |
| WO | WO 00/59845 | 10/2000 |
| WO | WO 2009/070600 A2 | 6/2009 |
| WO | WO2013/087355 A1 | 6/2013 |

OTHER PUBLICATIONS

B. Kumar et al., Ionic conduction through heterogeneous solids: Delineation of the blocking and space charge effects, J. Power Sources, vol. 160, No. 2, Oct. 6, 2006.

* cited by examiner

SOLID-STATE ELECTROLYTE FOR USE IN LITHIUM-AIR BATTERIES OR IN LITHIUM-WATER BATTERIES

The invention relates to solid-state electrolytes for use in lithium-air batteries or in lithium-water batteries. A gas-impervious and simultaneously ion-conducting separation (electrolyte function) of the anode comprising pure lithium and of the cathode containing $O_2$ has to be realized for secondary and primary lithium ion batteries in connection with oxygen reduction cathodes. The cathodes of lithium-air batteries are formed with air since air can act as a reducing agent. The product of the reaction ($Li_2O_2$) can be deposited at a gas diffusion layer based on carbon phases.

In the case of lithium-water batteries, water evidently itself serves as a cathode.

A property profile for suitable solid-state electrolytes having the following demands results from these conditions:

1. The solid-state electrolyte should reach a sufficiently high specific ion conductivity of at least $1.10^{-4}$ S cm$^{-1}$ at room temperature or in the relevant temperature range for the operation of such a battery.
2. The electrolyte must be gas-impervious to avoid any diffusion of oxygen into the anode region.
3. Good stability with respect to aqueous media must be present so that corrosion reactions are avoided.

As the prior art, impervious glass ceramics conducting lithium ions are available in the form of monolithic, planar and impervious substrates. The manufacture is described, for example, in US 2007/0231704 A1 and can be called complex and cost-intensive, not least due to a high requirement of raw materials. In addition, the glass ceramic material used has to have a very high specific conductivity since it has to have a sufficient thickness (migration path of the Li$^+$ ions) to ensure the mechanical stability of the substrate. In the event the specific ion conductivities of the glass ceramic material are too low, the resistance of the electrolyte or of the separator would be too high due to the large thickness. Such a ceramic separator with an electrolyte function is accordingly very complex and cost-intensive.

The commercial manufacture of these glass ceramics previously took place by way of a glass melt, casting a solid molded body, crystallization by means of direct heat treatment and a final mechanical postprocessing. Alternatively to this, the use of powder routes for the processing of ceramic or glass ceramic powders is also described in US 2010/0113243 A1.

Cold pressing, hot pressing, film casting, inkjet, aerosol printing and screen printing in conjunction with suitable heat treatments for a sintering of the green compacts are named as processes for shaping planar substrates from powders in conjunction with organic and aqueous consumables. The aim of all the named processes is the manufacture of monolithic, gas-impervious and planar substrates having thicknesses which ensure a high ion conductivity, on the one hand, and sufficient mechanical stability, on the other hand.

The manufacture of monolithic ceramic electrolytes as well as battery structures realized therefrom in the further procedure is described in US 2009/0317724 A1, US 2009/0317724 A1 or US 2007/0231704 A1 which were directly brought via a glass melt into a planar shape and were transformed into a glass ceramic material through a suitable heat treatment. The steps of milling and sintering are omitted here.

Li—Ti$_x$—Al$_y$-phosphates having variable x and y stoichiometries as well as substitution patterns of the cations Ti and Al with alternative suitable quadrivalent elements (Si, Ge) are used as materials. In particular the use of $GeO_2$ as a component in these compounds evidently results in very high specific ion conductivities of the synthesized compounds.

The manufacturing process via fusion shaping is to be considered as complex and cost-intensive (mechanical post-processing), on the one hand, and as limited with respect to the flexibility of the geometries which can be realized, on the other hand.

In total, the named lithium ion-conductive compounds have disadvantages in the realization as a monolithic substrate. On the one hand, the substrates have to be designed in substantial thicknesses to have sufficient stability and gas-imperviousness. This circumstance is clearly at the expense of the surface-normed resistance of the substrates which is inversely proportional to the thickness. This means that lithium ion-conductive compounds are required having specific conductivities which are as high as possible and thicknesses which are as small as possible. It is known for this purpose that in particular compounds with high $GeO_2$ contents have the required ion conductivity. Germanium is considered as an expensive raw material only available in small amounts. In addition, the availability is limited.

It is therefore the object of the invention to provide a solid electrolyte for use in lithium-air batteries or lithium-water batteries which has sufficient strength, good conductivity for lithium ions, gas-imperviousness and water resistance and which can be manufactured inexpensively in this respect.

This object is achieved in accordance with the invention by a solid electrolyte which has the features of claim 1. Advantageous embodiments and further developments of the invention can be achieved using features designated in the subordinate claims.

Within the framework of a planar battery structure, and here in particular in the packaging of planar structures, for lithium-air batteries and lithium-water batteries, these disadvantages are avoided if the combined separator electrolyte substrate is designed as an open porous ceramic carrier structure which is covered at least on the side of the cathode by one or more gas-impervious layers capable of conducting lithium ions. The mechanical stability of the structure is ensured by the porous carrier substrate, while the much thinner, but impervious layer(s), which is/are capable of conducting lithium ions, satisfy/satisfies the functions of the electrolyte and of the gas-impervious separation of the anode space and of the cathode space.

The separation of these functions provides the possibility of also using cost-intensive raw materials in small amounts for the ion-conductive layer (s) since much smaller amounts are required in comparison with a monolithic embodiment in accordance with the prior art. On the one hand, commercially available ceramic materials having suitable properties with respect to thermomechanical and thermochemical properties with relevance for the process of the materials used for the conductive layers can be used as the porous carrier substrates. An adaptation can also take place while taking account of the thermal coefficient of expansion and of the adhesion of the layer to a porous substrate. On the other hand, it is also conceivable to use inexpensive glass-ceramic compounds or glass/ceramic composites, which likewise have conductivity for lithium ions, for the porous carrier substrate. On the one hand, the total conductivity of the multi-layer structure could be positively influenced and, on the other hand, the properties of the porous carrier substrate could be much better adapted to the thin ion-conductive layer(s).

A monolithic porous ceramic having open porosity can be used for porous carrier substrates as carriers for the impervious, ion-conductive layer(s): preferably composed of $Al_2O_3$, $ZrO_2$, $MgAl_2O_4$, SiC, $Si_3N_4$ as well as in general ceramics and ceramic-ceramic composites; glass-bound ceramic types. The ceramic material should have an open porosity >15% by volume to a maximum of 80% by volume, wherein a value in the range 45% by volume to 60% by volume is to be preferred. The pore size should be in the range 1 μm-10 μm, preferably in the range 1 μm-5 μm. The carrier substrate should have a thickness in the range 20 μm-500 μm, preferably in the range from 20 μm-250 μm, particularly preferably in the range 20 μm-100 μm. Multi-layer porous ceramic substrates having stepped porosity can also be used for the carrier substrate. A layer formed on the surface of a carrier substrate should have a thickness between 10 μm-50 μm. The selection of the ceramic material for the carrier substrate can take place while taking account of the thermal coefficient of expansion of the material of the layer(s) formed on the carrier substrate to ensure good and secure adhesion.

The following conditions should apply to the carrier substrate:

Open porosity >15% by volume to max. 80% by volume, with a value of max. 60 having to be preferred Pore size 1 μm-10 μm with a preferred range 10 μm-20 μm.

Substrate thickness 100 μm-500 μm

The pore structure of the lower substrate having the coarser porosity should be so coarse in comparison with the finely porous top layer that no negative influencing occurs with respect to the throughflow properties. For the case of multilayer substrates having stepped porosities, the lower substrate, which is in direct contact with the electrolyte, should have the greatest porosity. Substrate layers applied to this layer and thinner substrate layers have finer porosities. It can thus be ensured that the final impervious and Li ion-conductive layer can be formed better.

An impervious layer acting as an electrolyte having a high lithium ion conductivity which is formed on the porous carrier substrate can either comprise amorphous glass based on a glass ceramic material or already crystallized glass ceramic particles. The use of such chemical compounds as sintering aids for the sintering of such glass-ceramic powders can be assumed as prior art. In this respect, the glass-ceramic particles are bound by an additional additive phase in the sintering process. Such additives can, for example, be lithium salts such as $Li_3PO_4$, $LinO_3$ or $LiCO_3$. However, further inorganic/non-metallic compounds can also be used in a supporting manner. Aluminates, titanates, phosphates as well as further chemical compounds which have properties supporting sintering can be used as such additives.

The starting particle size of the powder to be applied should lie between 0.1 μm and a maximum of 20 μm, preferably between 1 μm and 5 μm.

In the sintered state, the electrolyte layer should not have any open porosity which would allow an inlet of oxygen or water into the protected region of the battery and in particular of the cathode.

The closed porosity should amount to less than 20%, with values lower than 5 percent being preferred. The layer can either be fired together with the ceramic material of the carrier substrate in a co-firing process, or can be applied onto an already sintered carrier substrate and sintered in a post-firing process.

The layer thickness of the impervious electrolyte layer on the carrier substrate should amount to between 1 μm and 50 μm. The specific conductivity of the material should amount to at least $10^{-5}$ S cm$^{-1}$ and lie between this value up to $10^{-2}$ S cm$^{-1}$.

The procedure can thus be followed in the manufacture that dense sintering is carried out directly on the carrier substrate or on the layer of the carrier substrate having the smallest mean pore diameter.

Another variant can also be considered in addition to the application of a closed layer as a top layer onto a porous carrier substrate. The porous carrier substrate can in this respect be at least partially infiltrated with a suspension (slip) of the lithium ion-conductive glass ceramic material. In a further heat treatment, the particles of the glass ceramic material sinter with the ceramic material of the porous carrier substrate and form an impervious composite layer which is conductive for the ions but closed for gas and water.

The most varied deposition processes or coating processes with which ceramic powders are processed can be used for the manufacture of an impervious Li$^+$ conductive layer; they include e.g. screen printing, lamination of tapes, inkjet, aerosol printing or injection processes (thermal, plasma). A sintering capability of the material used for this/these layer(s) is required for the structure of such an impervious layer conductive of ions to be able to densify the applied powder layers in a subsequent heat treatment. The sintering capability can either be an intrinsic property of the respective glass ceramic material or can be effected by additional additives (cf. above). In this respect, it is likewise acceptable that a portion of the conductive powder infiltrates into the porous carrier layer and is densely sintered there.

Compounds based on the elemental formula $Li_{1+x}Al_xTi_{2-x}(PO_4)_3$ in conjunction with different substitution possibilities of trivalent (B=Cr; Ga; Sc, In; Y) and quadrivalent (C=Si, Hf, Zr, Ge) elements can be used as suitable composition ranges for the manufacture of the ion-conductive impervious layers, without germanium. In this respect, $0.05 \leq x \leq 1.9$, preferably $0.25 \leq x \leq 0.6$ should be observed.

The substituted elements influence the portion of mobile lithium ions in the crystal phases and thus directly influence the ionic conductivity. The substitution pattern thus has the following underlying elemental formula: $Li_{1+x}Al_{x-b}B_bTi_{2-x-c}C_c(PO_4)_3$.

Where $0.05 \leq x \leq 1.9$, preferably $0.25 \leq x \leq 0.6$, $0.05 \leq b \leq 1.5$, preferably $0.01 \leq b \leq 0.5$ and $0.05 \leq c \leq 1.5$, preferably $0.01 \leq c \leq 0.5$ should apply.

Supplementarily to the previously also named chemical compounds which can be added as sintering additives, analog chemical compounds of the respective substituted chemical elements of types B and C, with respect to the above-named elemental formula, can be used.

More complex or multiple substitutions of trivalent and quadrivalent chemical elements are also conceivable. In this connection, the use of Li$^+$ conductive fillers (inorganic/non-metallic phases) can also be taken into account which are sintered in the ion-conductive layers and can make a corresponding contribution to the total conductivity.

There is also the possibility of combining different powders having different compositions and thus also different properties (e.g. sintering capability, conductivity, chemical stability) with one another as a powder mixture and to sinter them to form a layer. The final properties of such sintered layers can thereby be directly influenced and adapted to specific demands.

The Li$^+$ conductive contact between the lithium metal and the thin layer acting as a solid electrolyte can be realized via a liquid electrolyte for the construction of the anode side. The porous carrier ceramic material can be filled with this electrolyte for this purpose. For instance, for a lithium seawater battery, the function of the liquid electrolyte can be satisfied by an anode protection layer. In this respect, such a contact layer can be used as a 1 molar $LiPF_6$ solution which is infiltrated into a porous EC-DEC membrane (volume ratio of 1:1) for stabilization. This liquid electrolyte phase is thus in conductive contact with the glass ceramic material and the lithium metal.

A decoupling of the mechanical stability of the planar structure, which is necessary on the one hand, from other desirable properties such as low resistance for the ion conduction, gas-imperviousness and high resistance with respect to humidity or aqueous media can particularly advantageously be achieved using the invention. More cost-intensive raw materials can thus also be used, for example, for the optimization of the thin layer(s) on the porous carrier substrate since comparatively small amounts are needed with respect to the total structure in comparison with a monolithic design.

A design of the solid electrolyte functional layer as a multilayer structure is also conceivable in order, for example, to apply a moderately conductive, but corrosion-stable top layer on a further layer which is easily conductive of ions, but is less stable, for example in direct contact with the cathode.

The porous design of the carrier substrate provides the opportunity to saturate the carrier substrate on the anode side with a liquid electrolyte and thus to realize a connection between the thin, conductive, ceramic solid electrolyte functional layers and the anode comprising metallic lithium which is highly conductive for ions. The necessity of producing the solid electrolyte in its entire thickness from a very highly conductive material, which may be very cost-intensive under certain circumstances, however, can thus be avoided in comparison with a monolithic structure of the solid electrolyte in accordance with the prior art.

There is the possibility with the invention of sintering the porous carrier layer and the ion-conductive layer in a co-firing process or also in a multi-stage process. Both planar, smooth structures and non-planar shapes such as roller-shaped, tubular or half-cylindrical structures can be manufactured and used.

The invention will be explained in more detail by way of example in the following.

Figure 2:
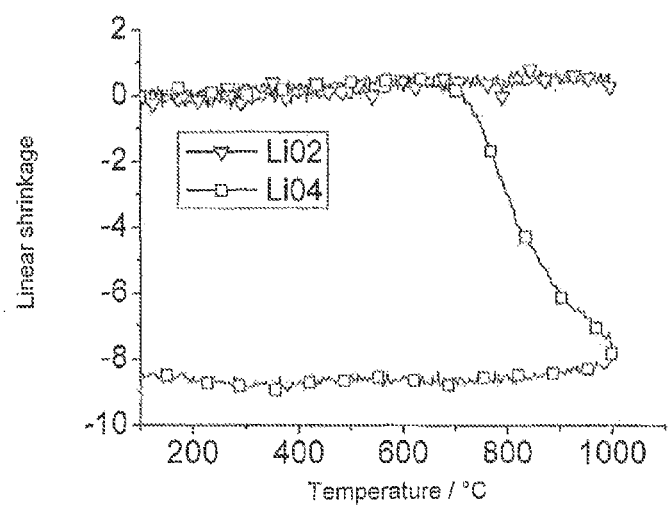
Figure 3:
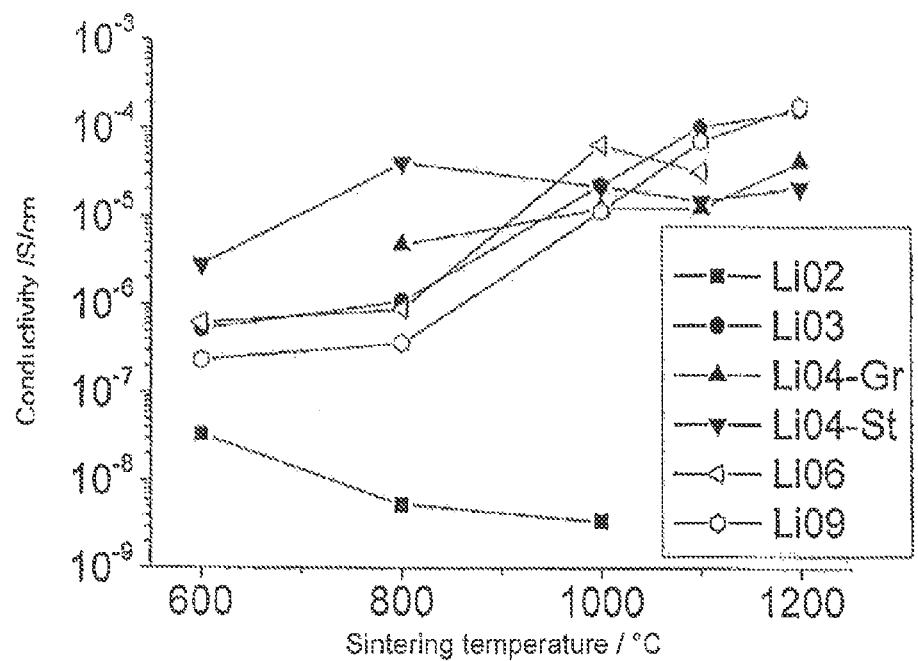
Figure 4:
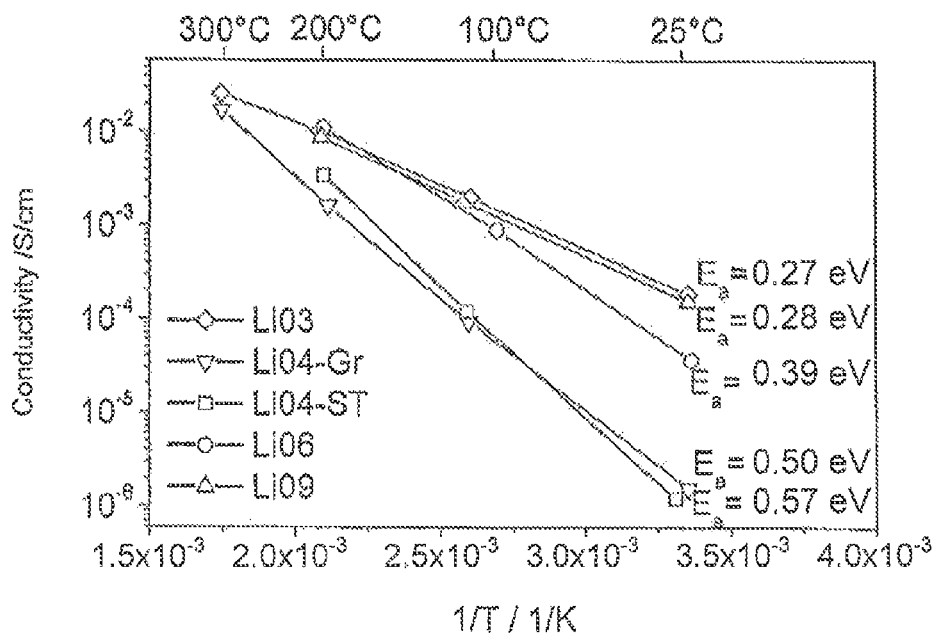

There are shown:

FIG. 1 in diagram form, densities of sintering bodies of the compounds Li02 and Li04 in dependence on the maximum sintering temperature;

FIG. 2 a comparison of the temperature-dependent sintering shrinkages of the compounds Li02 and Li04 measured by means of hot-stage microscopy;

FIG. 3 specific electrical conductivities at room temperature of the compounds listed in Table 1 in dependence on the sintering temperature of powder compacts; and FIG. 4 temperature-dependent specific conductivities and activating energies of selected compounds from Table 1 after sintering at air at 1000° C.

Figure 5:
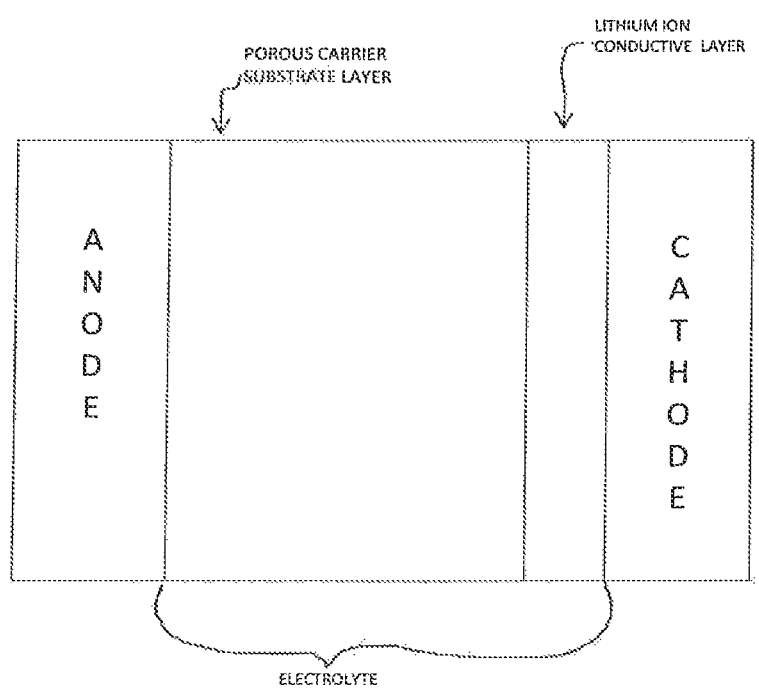

FIG. 5 is a schematic rendering of the electrolyte layers in a battery environment.

The samples named in the following are designated by Li0 and an additional digit.

Within the framework of the embodiment described in the following, on the one hand, the manufacture of glasses, their processing into powders and sintered powder compacts as well as the measurement of the ion conductivity by means of impedance spectroscopy are described.

Furthermore, the processing of two selected powders into pastes suitable for screen printing, the coating of porous ceramic substrates as well as the co-firing of the layers and the corresponding electrical conductivity measurements are shown. In this respect, value was placed on the fact that one powder has a good sintering capability and one powder has a worse or insufficient sintering capability.

Table 1 shows a selection of material compositions which were melted to glasses, further processed and characterized in accordance with the specification described in the following. With the exception of Li06, they are compositions of the system $Li_2O$—$Al_2O_3$—$P_2O_5$—$P_2O_5$. Li06 additionally comprises $SiO_2$.

TABLE 1 shows compositions of $Li_2O$—$Al_2O_3$—$TiO_2$—$(SiO_2)$—$P_2O_5$ glasses.

| Glass des. Oxide | Li02 | Li03 | Li04 | Li06 | Li09 |
|---|---|---|---|---|---|
| | Proportions of the oxides in mol % | | | | |
| $Li_2O$ | 14 | 16.25 | 20 | 18.6 | 16.25 |
| $Al_2O_3$ | 9 | 3.75 | 7.5 | 3.5 | 3.75 |
| $TiO_2$ | 38 | 42.5 | 35 | 39.5 | 42.5 |
| $P_2O_5$ | 39 | 37.5 | 37.5 | 31.4 | 37.5 |
| $SiO_2$ | | | | 7 | |
| Total | 100 | 100 | 100 | 100 | 100 |

In the glass manufacture, the chemicals listed in the following were used in the quality "analytical purity":

$Li_2CO_3$ (Baker, Mallinckrodt)
$Al(OH)_3$ (VWR)
$TiO_2$ (Sigma Aldrich)
$(NH_4)_2HPO_4$ (Sigma Aldrich)
$AlPO_4$ (Alpha Aesar)

The mixture of the raw substances took place in a screw-closable plastic container by means of a tubular mixer for approx. 30 minutes. The raw substance blends manufactured in this manner were filled into an $Al_2O_3$ crucible and were initially precalcinated at temperatures between 400° C. and 600° C. at air for at least 5 h and were subsequently melted to glasses at temperatures between 1300° C. and 1400° C. with dwell times of 2 h at a maximum temperature of 1400° C. at air. The casting of the glass melts took place either in deionized water (RT) or on a dry steel plate (RT). On a casting of the melt in water, the glass frit obtained can be dried in a drying cupboard at 150° for 12 h at air.

The glass frits were initially comminuted in a disk rocker mill to a screen fraction <500 μm for the further processing of the glasses. The final grinding of the precomminuted frits is carried out at air in a planetary ball mill down to typical particle diameters of $d_{10}$<1 μm, $d_{50}$=5 μm-10 μm and $d_{90}$<25 μm corresponding to the mass portions ($Q_3$) (measurement of the particle size distribution using laser diffraction).

The further processing can take place by cold pressing and sintering. The powders were pressed uniaxially into cylindrical samples having heights between 8 mm-10 mm and a diameter of 6 mm for the manufacture of solid sample bodies. The pressing force amounted to 2.5 kN. On a subsequent heat treatment carried out under atmospheric conditions, the sample bodies were sintered at air.

A typical oven profile: 25° C.-2K/min could be operated until the reaching of the maximum temperature to the amount of 1200° C. The maximum temperature was held for 1 h and cooling then takes place at a rate of 2 K/min down to 25° C.

FIG. 1 shows by way of example the behavior of compacts of the glass powders Li02 and Li04 in dependence on the maximum sintering temperature. Whereas the composition Li02 does not show any real sintering shrinkage or densification independently of the selected sintering temperature up to a maximum 1000° C., the density of Li04 increases constantly from a sintering temperature of 700° C. up to 1000° C. The composition Li02 can thus be called non-sinter active and the composition Li04 sinter active under atmospheric conditions.

This behavior is confirmed with reference to shrinkage curves (FIG. 2) which were measured by means of optical dilatometry in a hot-stage microscope. While a linear sintering shrinkage of around 8.5% occurred with Li04 up to a temperature of 1000° C., in the case of Li02 only a slight increase of 8·10-6 ppm/K was measured in the temperature range from 100° C. to 1000° C.

The phase compositions shown in Table 2 resulted from quantitative Rietveld X-ray analyses of Li02 and Li04 samples after sintering.

TABLE 2

Phase compositions of the crystallized compounds Li02 and Li04 using X-rays and Rietveld analyses

| Crystalline phases | Sample des. | Sintering temperature/° C. | | |
|---|---|---|---|---|
| | | 500° C. | 700° C. | 1000° C. |
| $Li_{1+x}T_{2-x}Al_x(PO_4)_3$/Mass % | Li04 | 77.8 | 86.0 | 91.5 |
| $AlPO_4$/Mass % | | 11.8 | <1 | — |
| $Li_{1+x}T_{2-x}Al_x(PO_4)_3$/Mass % | Li02 | 69.6 | 68.4 | 71.9 |
| $AlPO_4$/Mass % | | 21.4 | 22.8 | 22.3 |

In the case of Li04, the portion of $AlPO_4$ still present at 500° C. becomes lower as the sintering temperature increases and is no longer detectable by X-rays at temperatures above 700° C. The sintering density of this material also increases in this temperature interval. In contrast to this, the composition Li02 contains a much higher portion of $AlPO_4$ which also does not reduce as the sintering temperature increases. A real densification of this material is not measurable.

Subsequent to the sintering of the compacts, the respective end faces were sputtered with gold and the electrical conductivity was determined using impedance spectroscopy at room temperature in the frequency range from 1 Hz to 1 MHz and at an amplitude of 100 mV. The respective measurement at the maximum of the phase angle was used as the resistance value. The reciprocal of the specific resistance value represents the specific conductivity of the samples. FIG. 3 shows the specific electrical conductivities measured for the different glasses in dependence on the maximum sintering temperature. It is shown in comparison with FIG. 1 that the less sinter active material Li02 has the smallest electrical conductivity. With the other materials (Li03, Li04, L06 and Li09), the specific electrical conductivity increases by several orders of magnitude as the sintering temperature rises. Maximum electrical conductivities of more than $10^{-4}$ Scm$^{-1}$ are achieved with the materials Li09 and Li03 at a sintering temperature of at least 1000° C.

The specific electrical conductivities were furthermore measured using impedance spectroscopy in a temperature range between room temperature and 500° C. with selected samples which were sintered at a maximum temperature of 1000° C. FIG. 3 shows the plot of the temperature-dependent specific conductivities in accordance with the Arrhenius law.

The activation energies for the electrical conductivities of the materials can be derived from this plot. The measured activation energies lie between 0.27 eV and 0.57 eV on a mechanism running via ion conduction.

Powders of the materials Li02 and Li04 were used for a paste manufacture for the application as a layer to a microporous substrate after preparation in accordance with the above statements while using organic binding agents customary in thick film technology and a solvent type. The solid content of the pastes was in the range between 75% by mass and 85% by mass. The pastes were applied over the whole surface to film-cast $Al_2O_3$ substrates with a size of 2×2 cm$^2$, a thickness of 500 μm, porosities between 30% by volume and 38% by volume and mean pore diameters between 4 μm and 8 μm. The application of the pastes took place by means of double screen printing, with a drying of the first layer (30 minutes, 120° C., air) taking place between the two screen printing steps. In this way, layer thicknesses were applied between 30 μm and 40 μm in the non-sintered state onto the porous $Al_2O_3$ substrates. Subsequent to the drying process, the printed substrates were subjected to a firing process with a debinding step. In this respect, heating rates and cooling rates between 5 and 10 K/min and maximum temperatures between 1000° C. and 1100° C. (dwell time at the maximum temperature 1 h to 3 h) were used. The debinding was integrated into this co-firing process and took place at 500° C. at air for 2 h. The crystalline phase composition of the co-fired thick layers on the porous carrier substrates was checked qualitatively by means of radiography and was evaluated as identical to the phases found for the compounds Li02 and Li04 (cf. Table 2 in this respect).

The imperviousness of the co-fired substrates was checked via the mass spectroscopic measurement of the helium leak rate (apparatus: Helium Leak Locator, Oerlikon). Leak rates of more than $10^{-3}$ mbar$^{-1}$ were measured for the substrates coated with Li02, which allows a conclusion of non-impervious layers. Leak rates of less than $10^{-8}$ 1 mbar$^{-1}$ were measured for the substrates coated with Li04, which allows a conclusion of impervious layers. The measured leak rates relate to a circular measurement surface having a circumference of 1.55 cm. The results are in agreement with the sintering behavior of the compounds Li02 and Li04 as solid powder compacts.

The determination of the electrical conductivity of these coated samples took place via electrochemical impedance spectroscopy. For this purpose, circular samples having a diameter of 1.27 mm were prepared from the sintered and coated 2×2 cm$^2$ substrates. These samples were installed in a 2-electrode assembly cell (Swagelok® cell) for this measurement. Two round stainless steel platelets, which act as inert in the given electrochemical conditions ("blocking electrodes"), are used as the electrodes. The round sample pieces were placed between these electrodes and were saturated with some drops of electrolyte (LP40, commercially available battery electrolyte 1M LiPF$_6$ in EC:DEC 1:1) (approx. 40-60 mg). The electrical contacting takes place on one side directly through the accumulator of the cell and on the other side via a spring which ensures a uniform contact pressure on the samples.

The measurement took place at a potentiostat having an integrated FRA (Gamry Reference 600). Since measurement took place in 2-electrode arrangements, the reference electrode had to be placed on the counter-electrode. The impedance measurement was carried out at an amplitude of 100 mV with a resting potential of the cell; the examined frequency range was between $10^5$ Hz and 1 Hz. The ohmic resistance portion at high frequencies (approx. $10^4$ Hz-$10^5$ Hz) was used for the calculation of the electrical conductivity.

Table 3 lists the results of the impedance-spectroscopic measurements at the coated substrates. The porous layers formed from Li02 show clearly higher electrical conductivities than the impervious layers based on Li04. This is explained by the fact that the liquid electrolyte has saturated the porous Li04 layer and that thereby the conductivity of the electrolyte is predominantly measured. In contrast to this, in the case of the substrates coated with Li04, specific electrical conductivities are measured which are only slightly below the electrical conductivities for the solid Li04 sintering bodies shown in FIG. 3.

TABLE 3 provides specific conductivities of the porous $Al_2O_3$ substrates coated with Li02 and Li04 measured using impedance spectroscopy.

| | Specific conductivity at the respective sintering temperature/mS cm$^{-1}$ | | |
|---|---|---|---|
| | 800° C. | 1000° C. | 1200° C. |
| Lithium-ion conductive layer | | | |
| Li04 (thickness approx. 30 μm) | $1 \cdot 10^{-3}$ | $4 \cdot 10^{-3}$ | $2 \cdot 10^{-2}$ |
| Li02 (thickness approx. 40 μm) | $8 \cdot 10^{-2}$ | $7 \cdot 10^{-2}$ | — |

The invention claimed is:

1. A solid-state electrolyte for use in lithium-air batteries or lithium-water batteries, comprising a multi-layer structure for providing mechanical stability and lithium ion conductivity wherein the function of mechanical stability is on one layer and the function of lithium ion conductivity is separated on at least one second layer, said one layer comprising an open-pore ceramic carrier substrate comprising a ceramic material which is selected from $Al_2O_3$, $ZrO_2$, $MgAl_2O_4$, SiC and $Si_3N_4$ for providing the mechanical stability function and wherein the pores of said carrier substrate have a pore size in the range of 1 μm and 10 μm, and said at least one second layer which is conductive for lithium ions for providing the lithium ion conductivity function, said second layer having an electrical conductivity of at least $10^{-5}$ Scm$^{-1}$, which is gas-impervious and which is sintered on a surface of said ceramic carrier substrate and presents a face open to a cathode of a battery, and wherein said carrier substrate layer has greater mechanical strength and a larger layer thickness than the at least one second layer.

2. A solid-state electrolyte in accordance with claim 1, characterized in that the carrier substrate has a porosity of at least 15% and a maximum of 60%; and the substrate thickness is in the range from 20 μm-500 μm, and wherein the at least one second layer has a thickness between 10 μm and 50 μm.

3. A solid-state electrolyte in accordance with claim 1, characterized in that the thickness of the carrier substrate is at least twice as large as the thickness of the at least one second layer.

4. A solid-state electrolyte in accordance with claim 1, characterized in that the carrier substrate presents a face open to an anode of a battery and has at least two layers each having a different porosity or, starting from an anode-side surface, has a graduated porosity, which reduces in size in the direction of the ion-conductive second layer.

5. A solid-state electrolyte in accordance with claim 1, characterized in that the pores of the carrier substrate are infiltrated with a liquid electrolyte conductive for lithium ions.

6. A solid-state electrolyte in accordance with claim 1, characterized in that the at least one surface of the carrier substrate is coated over the full surface with the at least one gas-impervious second layer.

7. A solid-state electrolyte in accordance with claim 1, characterized in that said at least one second layer is partly infiltrated into the carrier substrate.

8. A solid-state electrolyte for use in lithium-air batteries or lithium-water batteries, comprising a multi-later structure for providing mechanical stability and lithium ion conductivity wherein the function of mechanical stability is on one layer and the function of lithium ion conductivity is separated on a least one second layer, said one layer comprising an open-pore ceramic carrier substrate comprising a ceramic material which is selected from $Al_2O_3$, $ZrO_2$, $MgAl_2O_4$, SiC and $Si_3N_4$ for providing the mechanical stability function, said carrier substrate having a porosity of at least 15% and a maximum of 60%; the pores of said substrate having a pore size in the range of 1 μm-10 μm; and the substrate thickness is in the range from 20 μm-500 μm, and said at least one second layer which is conductive for lithium ions for providing the lithium ion conductivity function, said second layer having an electrical conductivity of at least $10^{-5}$ Scm$^{-1}$, which is gas-impervious and which is sintered on a surface of said ceramic carrier substrate and presents a face open to a cathode of a battery, said carrier substrate layer having a greater mechanical strength and having a thickness at least twice as large as the thickness of said at least one second layer.

* * * * *